United States Patent [19]
Johnson

[11] Patent Number: 5,197,818
[45] Date of Patent: Mar. 30, 1993

[54] TOWER CONSTRUCTED OF PULTRUDED COMPOSITES

[76] Inventor: David W. Johnson, 1884 Sunset Blvd., San Diego, Calif. 92103

[21] Appl. No.: 715,910

[22] Filed: Jun. 14, 1991

Related U.S. Application Data

[63] Continuation-in-part of Ser. No. 541,547, Jun. 21, 1990, Pat. No. 5,024,036.

[51] Int. Cl.$^5$ .............................................. F16D 1/00
[52] U.S. Cl. .................................... 403/217; 403/172
[58] Field of Search ................ 403/217, 218, 219, 172

[56] References Cited

U.S. PATENT DOCUMENTS

| | | | |
|---|---|---|---|
| 1,719,440 | 7/1929 | Nathan | 403/217 X |
| 4,332,501 | 6/1982 | Slysh | 403/219 |
| 4,534,672 | 8/1985 | Christian, III | 403/172 |
| 4,566,818 | 1/1986 | Schwartz et al. | 403/172 |

FOREIGN PATENT DOCUMENTS 19103  8/1914  Denmark .......................... 403/217

Primary Examiner—Andrew V. Kundrat
Attorney, Agent, or Firm—Ralph S. Branscomb

[57] ABSTRACT

An interlocking joint uses an interlocking mounting bracket to permit the easy incorporation of diagonal braces on the structure. The bracket is primarily intended for use with composite beams that cannot be effectively bolted, nailed, or welded together.

5 Claims, 1 Drawing Sheet

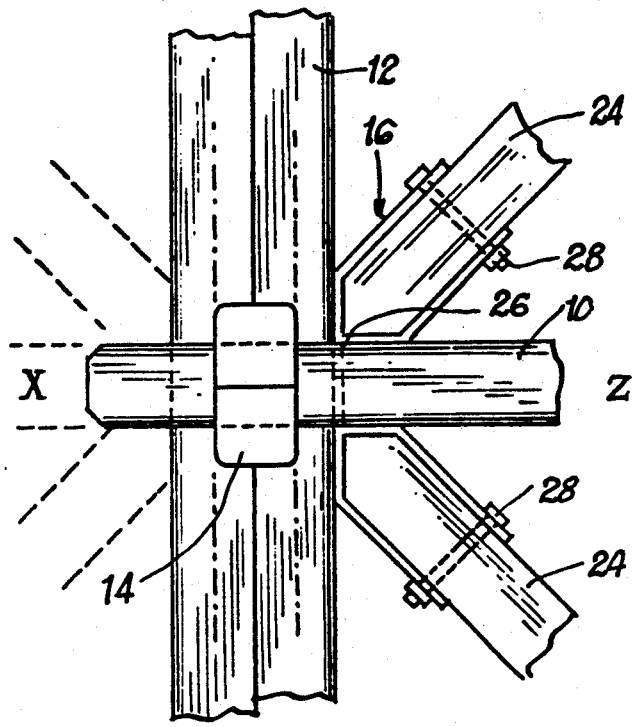
FIG. 1
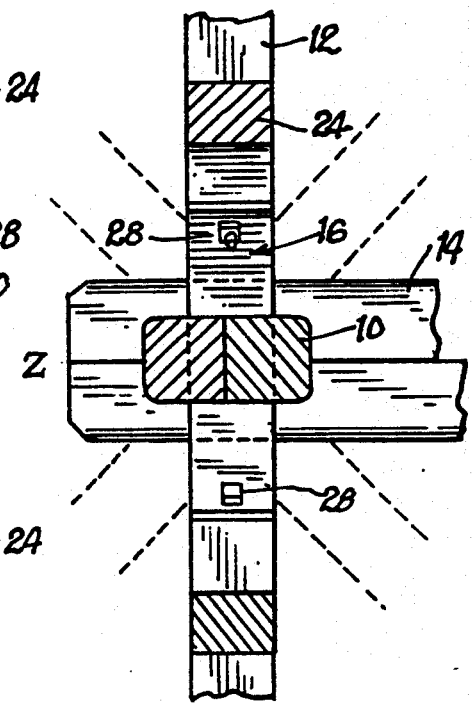
FIG. 2
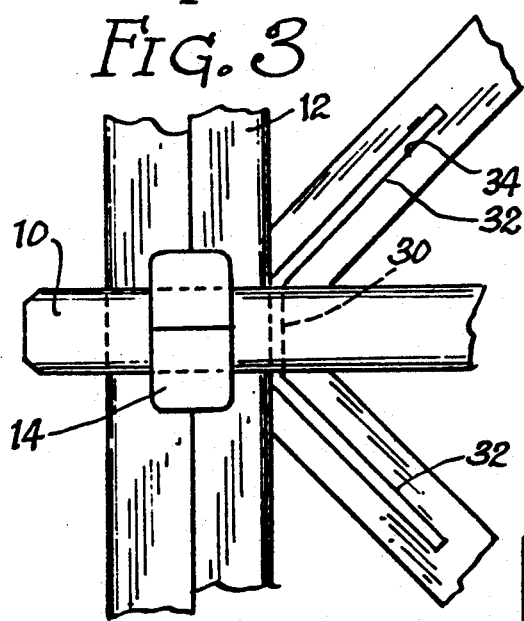
FIG. 3
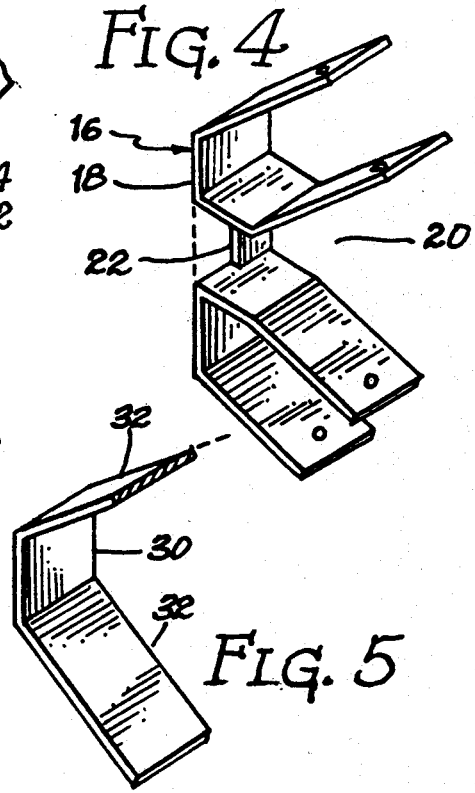
FIG. 4
FIG. 5

TOWER CONSTRUCTED OF PULTRUDED COMPOSITES

BACKGROUND OF THE INVENTION

This application is a continuation in part of U.S. Pat. No. 5,024,036, filed Jun. 21, 1990 having Ser. No. 541,547 invented by David W. Johnson.

This disclosure is in the field of interlocking beam construction and whereas the invention could be used with many types of construcion materials, it is most useful for smooth, synthetic materials such as pultruded composites. In the parent application the inventor disclosed a number of details of construction as well as structures using interlocking composites as the building material. As can be seen from an inspection of that patent, this type of construction works best with a reticulated lattice structure. Other patents using this same construction are U.S. Pat. No. 4,825,620 issued on STRUCTURAL SUPPORT OF INTERLOCKING LATTICE CONSTRUCTION, U.S. Pat. No. 4,809,146 issued for an ENCLOSURE WITH INTERLOCKING FRAME JOINTS, and a SUPPORT STAND and a WINE RACK of the same basic construction have been patented. There are several other patents pending.

These patents cover details of construction in some cases, and structures in other cases, formed with an interlocking joint that works well in pultruded composites due to the difficulty in attaching one member to the other.

However, because grid structures have a tendency to collapse like a parallelogram, some means of triangulation was needed. The joint which works well for orthogonal members does not inherently accommodate diagonal braces. Invasive fastening systems such as nails or bolts are not appropriate. The fiber glass and resin composite products which are used would ideally have some interconnecting mechanism to provide triangulation at the joints. A relatively dense grid of this kind is very strong indeed.

SUMMARY OF THE INVENTION

The invention is a bracket that interfits in the joint structure, captured between several of the members so that it is rigid without the use of fasteners. The bracket could be made of metal, but it could also be made of composites. The nature of some structures is such that it is not desirable to put metal in the structure if at all possible due to its electrical conductivity and its tendency to corrode.

Although the diagonals are pinned into the ends of the bracket in one embodiment, it would also be possible to epoxy them in place for a very strong completely non-metallic joint.

BRIEF DESCRIPTION OF THE DRAWINGS

FIG. 1 is a front elevation view of the joint;

FIG. 2 is a view from the left side of FIG. 1;

FIG. 3 is a front elevation view of a modified form of the bracket;

FIG. 4 is a perspective view of the bracket used in FIGS. 1 and 2; and,

FIG. 5 is a perspective view of the modification of the bracket used in FIG. 3.

DETAILED DESCRIPTION OF THE PREFERRED EMBODIMENTS

The joint itself in its basic form has been detailed in other patents as well as the parent case and will not be described in detail herein. The joint is formed with six members, two in each of the orthogonal directions—that is, along the X-Y-and Z-AXES. These member pairs are designated 10, 12 and 14, respectively. An inspection of the Figures reveals that there are twelve possible positions for diagonal braces, there being four possibilities in every plane. Several braces are shown in phantom in the various positions in FIG. 1. Because of the nature of the construction, it is possible to put a brace at every one of the two-dimensional junctions so that all twelve of the possible diagonals can be used.

The bracket 16 shown in FIG. 4 has a back panel 18 where it bifurcates into a Y 20. The backing panel 18 slips between adjoining faces of the members, and might have a notch 22 in the narrow passage between two of the members that form the joint is blocked on one half. Although the notch is not needed on all of the possible positions, it would function even in the places where it is not absolutely essential.

The diagonals 24 fit in the crook 26 of the joint flushly with the sides of the bifurcations 20, where they are pinned with bolts 28 in the event that the diagonals are composites, they could be epoxied into place so they would not have to be bored. Thus the diagonals can take compression and tension, whereas the diagonal in the parent patent takes only compression.

The second embodiment shown in FIG. 5 is somewhat simpler than the first, comprising a central portion 30 and two flat ends 32. This could be mounted to the diagonals in somewhat the same fashion as the first embodiment in FIG. 1, or the diagonal could be provided with a slot at 34 and slipped over the respective ends 32. If the slot is made slightly narrower than the end 32 of the second bracket, it will snap nicely into place and can be securely held with epoxy.

The use of this simple, strong, and inexpensive means to attach diagonals to an otherwise unbraced rectangular structure adds a valuable dimension to this expanding area of technology. It makes possible the construction of microwave fixtures, radio and television stations, and high-tension power wire towers without the accompanying annoying characteristics of steel, such as the danger of electrocution with power wire towers, and interference with broadcasting stations.

It is hereby claimed:

1. A joint construction comprising:

(a) a plurality of interlocking joint members defining an interlocking joint with at least a first and second of said joint members extending out from said joint different directions to define a plane;

(b) said first joint member defining said interlocking joint at least in part by passing through an opening in said second joint member;

(c) said first member and the opening of said second member together defining a narrow passageway through said opening alongside said first joint member;

(d) a bracket having a backing strap passing through said narrow passageway and defining a diagonal brace mount in said plane substantially at the intersection of said first and second joint members at said joint; and, (e) a diagonal brace positively secured to said mount to provide bracing strength for both longitudinal compression and tension forces exerted along said brace and said mount.

2. Structure according to claim 1 wherein the backing strap of said bracket extends completely through said narrow passageway and defines an additional diagonal brace mount through such that a brace mount is provided on each side of said second joint member, and including a second diagonal brace positively secured to said second brace mount.

3. Structure according to claim 2 wherein said bracket is bifurcated at each end in a Y-shaped configuration paralleling the sides of the joint members at said joint, and the bifurcations bend parallel to and flush against the sides of the respective diagonal brace, straddling the ends of same.

4. Structure according to claim 2 wherein said diagonal mounts are planar extensions of said backing strap and said diagonals are slotted to straddle and seat said respective ends, said planar extensions being dimensioned to lie within the projected external contour of the respective diagonal braces and not project beyond the sides thereof.

5. Structure according to claim 4 wherein said diagonals and braces are both pultruded composites and said diagonals are epoxied to the respective brackets.

* * * * *